United States Patent [19]

Avra et al.

[11] 4,445,650
[45] May 1, 1984

[54] HIGH SPEED BIDIRECTIONAL MAGNETIC TAPE TRANSPORT WITH CONSTANT TENSION

[75] Inventors: Raymond E. Avra; Lawrence Herrington, both of Fountain Valley, Calif.

[73] Assignee: MegaTape Corporation, Duarte, Calif.

[21] Appl. No.: 285,756

[22] Filed: Jul. 22, 1981

[51] Int. Cl.³ .............................................. G11B 15/32
[52] U.S. Cl. .................................. 242/192; 242/200; 474/4
[58] Field of Search ............... 242/192, 197, 198, 199, 242/200, 201; 360/96.5; 474/1, 4; 74/810

[56] References Cited

U.S. PATENT DOCUMENTS 4,095,758  6/1978  Shroff ................................. 242/192

Primary Examiner—Stuart S. Levy
Assistant Examiner—Lloyd D. Doigan
Attorney, Agent, or Firm—Fraser and Bogucki

[57] ABSTRACT

A length of magnetic tape extending between a pair of reels within a cartridge is driven bidirectionally at high speeds with substantially constant tension by a transport having a pair of capstans engaging and movable to accommodate the constantly changing tape packs on the reels. Constant tape tension is achieved by a driving arrangement utilizing pairs of pulleys of slightly different diameter coupled via overriding unidirectional clutches to shafts which mount the capstans and are driven from a common motor by belts coupled to the different pairs of pulleys. The difference in pulley diameter causes the capstan engaging the takeup reel to be driven slightly faster than the capstan engaging the supply reel so as to maintain the constant tape tension. The tape cartridge has a single front door which is automatically raised upon insertion of the cartridge into the transport by opposite bosses on the transport which engage camming levers at the opposite ends of the front door. The cartridge also includes spring-loaded arrangements for blocking out rotation of the reels except when the cartridge is inserted in the transport, and dust covers which are movable out of the way by movement of the capstan shafts into slots in the cartridge. A camming arrangement resiliently engages the bottom of the cartridge to force the installed cartridge into engagement with three different height referencing elements. A separate locking arrangement engages an aperture in the bottom of the cartridge to lock the installed cartridge in a desired horizontal position until the camming arrangement releases the cartridge.

12 Claims, 18 Drawing Figures

HIGH SPEED BIDIRECTIONAL MAGNETIC TAPE TRANSPORT WITH CONSTANT TENSION

BACKGROUND OF THE INVENTION

It is often desired in high speed and wide band magnetic tape systems to drive a tape bidirectionally while minimizing the instantaneous speed variation and providing a constant tape tension across the magnetic head. If this can be done, analog (including video and instrumentation) data and digital data can be recorded with high density and high data transfer rates. A particularly significant need for these features is encountered in some data processing applications, such as where a magnetic tape store is used as backup for a magnetic disk file. Since the introduction of so-called "Winchester" technology, workers in the art have devised various magnetic tape, floppy disk and rigid disk systems to preserve data with reference to some fixed point in time until a later backup file can be generated. This need arises because in Winchester disk systems the operating mechanism is assembled under clean room conditions in a closed structure, which is not accessible in the field for maintenance purposes. Thus in the event of head crash or other defect the disk file is immobilized, and the owner or operator of the data processing system must reconstruct the data in process by going to the backup storage and repeating all intermediate inputs and manipulations during the interim. Even though improvements in Winchester-type systems have increased the mean time before failure, backup is still needed because without it the effects on a typical system, such as a large data base system, would be virtually catastrophic.

Among the techniques for backing up a Winchester disk file are the use of an additional duplicate file, which is inordinately expensive. Video tape recorders which have adequate bandwidth have been tried. However, such records are not designed to the standards of signal reliability required for digital data systems. Floppy disks which have relatively limited storage capacity, and ½" or ¼" tape cassettes or cartridges, are the most commonly used backup systems because they may be readily accumulated, stored and reused. However, the data transfer rate with most cassettes and cartridges is substantially slower than the data transfer rate from a Winchester disk so that quite complex controller mechanisms must be utilized. Furthermore, the amount of time required for complete transfer of the contents of a disk file can be excessively long, typically ranging from 5 to 7 minutes at a minimum to an order of magnitude longer at the other extreme. Some systems, known as data streamers, attempt to run a tape transport sufficiently fast and record at sufficiently high densities to accept a stream of data off the disk file virtually without interruption. Heretofore, however, these systems have been high cost units requiring substantial maintenance supervision, and they have seldom been economically justified for the backup application.

A review of magnetic tape drive technology leads only to confusion as to the type of mechanism that would best provide a high speed bidirectional system having constant tension, which enables wow, skew and flutter to be minimized while also greatly reducing the propagation of shocks along the tape and the danger of tape breakage. High speed tape systems utilizing vacuum chambers and other sophisticated devices for controlling tape tension are impractically complex and expensive for backup system applications. Peripheral reel drive systems are known, but the practical application of these has largely been limited to the instrumentation field. Some attempts have been made to simplify bidirectional drives by using one way clutches in the drive trains to tape reels, sometimes in conjunction with pulleys for providing drag on the trailing side of the tape. For the most part, however, prior art systems of this type which attempt to control tape tension through various speed differential and drag arrangements are incapable of the high performance requirements imposed on disk backup systems, usually because the tensioning arrangement is not sufficiently precise and is not sufficiently closely related to the tape drive. The lack of precision in the tensioning arrangement is principally due to changing reel diameters and short term friction stability. An example of this type of system is provided by U. S. Pat. No. 3,465,357 of Anderson in which pairs of pulleys of different diameter are commonly coupled to provide tape tension via unidirectional clutches coupling the pulleys to the tape reels. The resulting arrangement, though relatively simple and inexpensive, is not capable of meeting the high performance requirements of such applications as a disk backup system, largely due to the remote and imprecise effects of differential reel drag when related to a single capstan drive.

Examples of other interesting but ineffective tape systems for disk backup purposes are provided by U.S. Pat. Nos. 3,090,573 of Matovich, Jr., 3,806,061 of Kollar et al, 3,869,100 of Flippen, Jr., 3,809,336 of Kollar et al, 3,779,485 of Wolf et al, 3,948,464 of Hata, 3,235,194 of Willis, 4,093,149 of Shroff et al, 4,094,478 of Shroff et al, 4,095,758 of Shroff and 3,921,933 of Rotter et al. Matovich utilizes a pair of one-way clutches to drive and alternately bias a capstan in a forward and reverse drive system. Kollar et al U.S. Pat. No. 3,806,061 utilize one-way magnetic clutches to create a drag on the supply spool. Flippen employs one-way clutches and drag clutches at the reel shafts to provide tape tension, as does Kollar et al U.S. Pat. No. 3,809,336. In Wolf et al magnetic clutches are used to drive the tape reels. Hata take a different and somewhat more effective approach of driving the reels through contacting capstans, but at the expense of a complicated and cumbersome reel mounting and capstan driving arrangement. Other examples of reel driving capstans are provided by Willis and by the various Shroff patents where two servo controlled motors are used. Rotter et al use unidirectional clutches to provide a braking torque.

The art references above pertains to a wide variety of digital, audio and video applications. Although high speed bidirectional operation and constant tension are the subject of many patents, none are known which provide a satisfactory resolution of the problem for many applications. Conventional transports using hub mounted reels are designed for high acceleration and deceleration rates using compliance arms or vacuum systems, and in addition to being expensive do not provide precise speed or tension control, as well as requiring the inconvenience of tape reels.

BRIEF SUMMARY OF THE INVENTION

Tape drives in accordance with the invention provide high speed bidirectional operation in conjunction with constant tape tension by combining movable capstans that engage the tape reel peripheries, with differential pulley drives operated in conjunction with pairs of overriding unidirectional clutches. A single drive motor, which may be servo controlled, is driven in a desired direction, automatically engaging one of the unidirectional clutches to drive the movable capstan on the leading or takeup reel side of the transport. The movable capstan at the trailing reel, on the opposite side of the magnetic head, then tends to be driven at precisely the same speed by its frictional engagement with the supply reel. However, a differential pulley system coupled between the capstan shafts and driven by belts from the single drive motor incorporates a larger pulley at the supply side than at the takeup side, so that a small constant differential velocity is introduced, providing uniform tension across the magnetic head. The second unidirectional clutch in the capstan shaft coupling prevents overspeeding. This arrangement is such that a single drive motor can accelerate, decelerate or drive the tape at constant velocity in either direction while uniform tape tension and smooth tape tension motion are achieved. Overshoot of the supply reel and formation of a tape loop are prevented. Also, any tape slack which is present at the outset is taken up immediately.

In a more specific example of a system in accordance with the invention, the movable capstans are supported on movable pivots in a parellelogram structure. Pulleys on the capstan shafts encompass one-way clutches which provide the clutch pairs desired for each capstan shaft. A pair of belts extending about the pulleys on the two capstan shafts also encompass fixed pulleys on the bidirectional drive motor, and idler pulleys which are mounted on a spring loaded arm hold the belts in frictional driving engagement against the capstan pulleys. While the capstans move in and out as the reels decrease or increase in size, the pivoting, spring loaded, independent capstan assembly structure maintains alignment. In conjunction with this arrangement, the magnetic head assembly is mounted on a carriage which provides lateral translation of the magnetic head relative to the magnetic tape. The magnetic head is stepped one or some other predetermined number of track positions every time the tape is reversed at the end of its travel, providing a serpentine recording of successive tracks on the tape to achieve high density and substantially continuous operation with only brief intervals during reversal times during which data is not directly transferred. Stepping of the head is advantageously carried out by an arrangement utilizing a stepper motor and attached worm drive to adjust the vertical positioning of the head relative to the deck via a single shaft in direct line with the stepper motor and worm drive.

Further in accordance with the invention, a novel cartridge has been devised for insertion into and incorporation with the direct reel drive type of capstan. The reels are independently journaled in the cartridge body and arc-shaped apertures adjacent the reels provide access for the movable capstans via hinged and spring-loaded dust covers. The reels which are locked against rotation when the cartridge is not in use are freed upon insertion of the cartridge by corresponding sliding movement of slidable locks so as to remove locking tabs from the inner peripheries of the reels. A spring loading and locking feature exerts pressure from the cartridge against the capstans which themselves are biased in the opposite direction by a spring loading force. When inserted, the tape within the cartridge automatically engages the magnetic heads, access to which is provided by the upward pivoting of a single door at the front edge of the cartridge. Pivoting movement of the door is provided by rotation of camming levers at the opposite sides of the door upon engagement with opposite bosses as the cartridge is inserted.

Proper vertical positioning of the cartridge relative to the magnetic head is assured by a cartridge registration arrangement providing for 3 point vertical registration. A camming device bears upwardly against the underside of the cartridge to hold the top surface of the bottom plate thereof against a pair of rods at the front end of the cartridge and the top of the rear of the cartridge against another reference element. The camming device includes an arrangement of pivotally coupled levers mounted on the deck and including a coil spring for contacting the underside of the cartridge and a control rod for activating the arrangement of levers to release the cartridge from its registered position.

A separate spring locking device holds the cartridge in a proper longitudinal position within the deck and relative to the magnetic head by a manually controlled locking rod which is vertically mounted in the deck and which is slidable into engagement with an aperture in the underside of the cartridge to hold the cartridge in place. The locking rod bears against the top of the control rod of the camming device to prevent unlocking of the cartridge while the camming device is holding the cartridge in the operative position. Movement of the control rod of the camming device into a position to release the cartridge simultaneously slides a notch in the top thereof under the locking rod, allowing the locking rod to be lowered to unlock the cartridge. A microswitch contacted by the control rod prevents energization of the drive motor if the cartridge is not fully inserted or if the capstans are moving when the cartridge eject is actuated.

BRIEF DESCRIPTION OF THE DRAWINGS

A better understanding of the invention may be had by reference to the following description, taken in conjunction with the accompanying drawings, in which.

DETAILED DESCRIPTION

Figure 1:
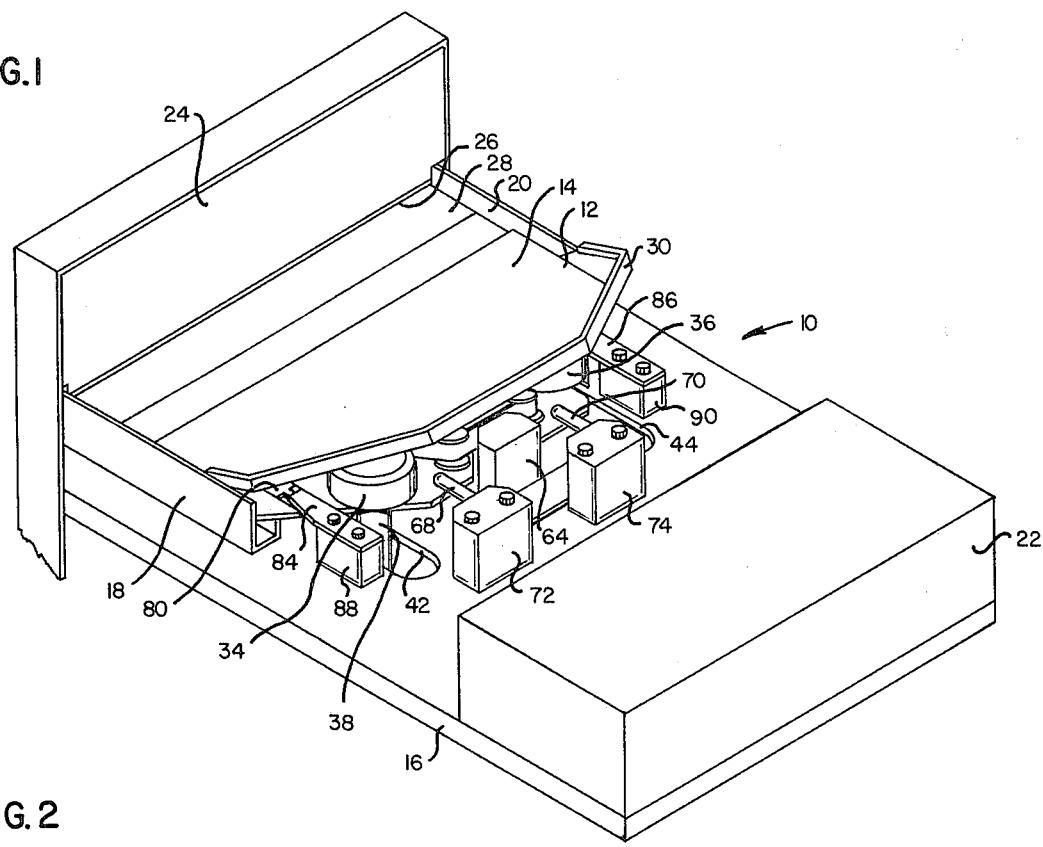
FIG. 1 is a perspective view of a tape transport in accordance with the invention showing a tape cartridge installed in the transport.
Figure 2:
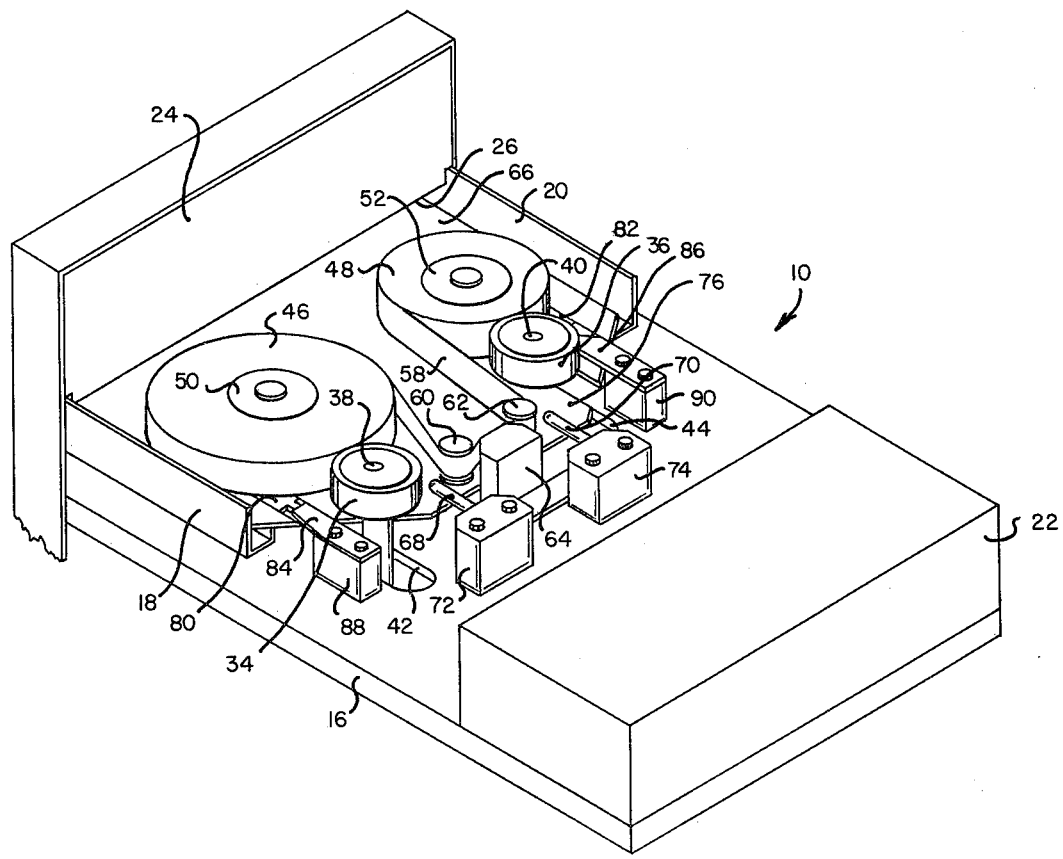
FIG. 2 is a perspective view similar to that of FIG. 1 but with the cover of the cartridge removed to show the interior thereof.

FIGS. 1 and 2 depict the top portion of a transport 10 in accordance with the invention. In FIG. 1 a magnetic tape cartridge 12 is installed in the transport 10. The cartridge 12 has a generally enclosed housing 14, the top portion of which is removed in the view of FIG. 2 to show the interior details of the cartridge 12 when in the installed position.

The transport 10 includes a base member in the form of a deck 16 which mounts a pair of opposite bosses 18 and 20 for receiving the cartridge 12. A cover 22 at the rear of the deck 16 houses electronic components and other parts for the transport 10. The front of the deck 16 is coupled to a front panel 24 having a slot 26 therein for receiving the cartridge 12. The slot 26 is normally covered by a door 28 coupled by a hinge to the top of the slot 26. The door 28 which is normally disposed in a generally vertical position to cover the slot 26 is pushed upwardly and into a generally horizontal position by the cartridge 12 when inserted in the transport 10. The door 28 is not shown in FIG. 2 for clarity of illustration.

As seen in FIG. 1 the cartridge 12 has a front door 30 forming a part of the enclosed housing 14. The front door 30 is pivotally coupled at the opposite ends thereof to other portions of the enclosed housing 14. As described in detail hereafter in connection with FIGS. 15 and 16, the opposite bosses 18 and 20 engage camming levers formed at the opposite ends of the front door 30 so as to raise the front door 30 and expose the interior of the cartridge 12 as the cartridge 12 is slid along the guides 18 and 20 into the installed, operative position shown in FIG. 2.

The transport 10 includes a pair of capstans 34 and 36 mounted respectively at the top ends of a pair of shafts 38 and 40. The shaft 38 resides within and is movable along a slot 42 in the deck 16. The shaft 40 resides within and is movable along a slot 44 in the deck 16. As described in detail hereafter the shafts 38 and 40 move along their respective slots 42 and 44 as necessary to enable the capstans 34 and 36 to engage tape packs 46 and 48 on a pair of reels 50 and 52 respectively. The capstans 34 and 36 are forced into contact with the tape packs 46 and 48 when the cartridge 12 is in the installed, operative position. As the tape packs 46 and 48 vary in size with rotation of the reels 50 and 52, the shafts 38 and 40 move back and forth within the slots 42 and 44 to maintain the capstans 34 and 36 engaged with the tape packs 46 and 48.

The tape packs 46 and 48 are formed by a length of magnetic tape 58. Between the opposite reels 50 and 52, the tape 58 extends along a path which includes a pair of idler rollers 60 and 62 rotatably mounted within the cartridge 12 and a transducer in the form of a magnetic head 64. The magnetic head 64 is mounted on the transport 10 by an arrangement shown and described hereafter in connection with FIG. 18 which is capable of precisely vertically positioning the magnetic head 64. In this manner a head within the magnetic head assembly 64 can precisely address different tracks on the magnetic tape 58. Both the idler rollers 60 and 62 and the reels 50 and 52 are rotatably mounted on a base 66 of the enclosed housing 14 of the cartridge 12.

Figure 13:
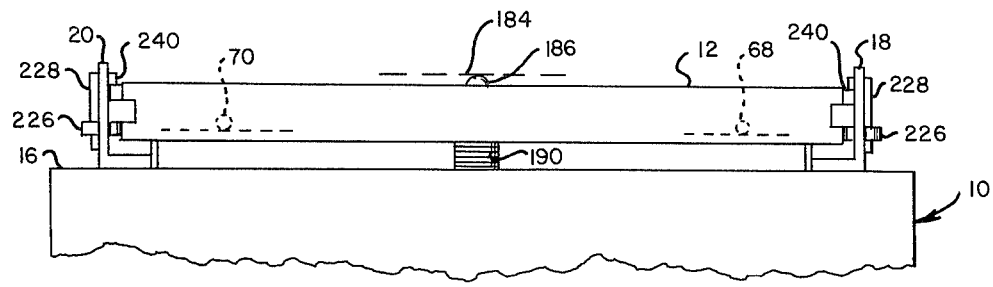
FIG. 13 is a front view of a portion of the transport of FIG. 1 showing the arrangement for providing desired height registration of the tape cartridge.
Figure 14:
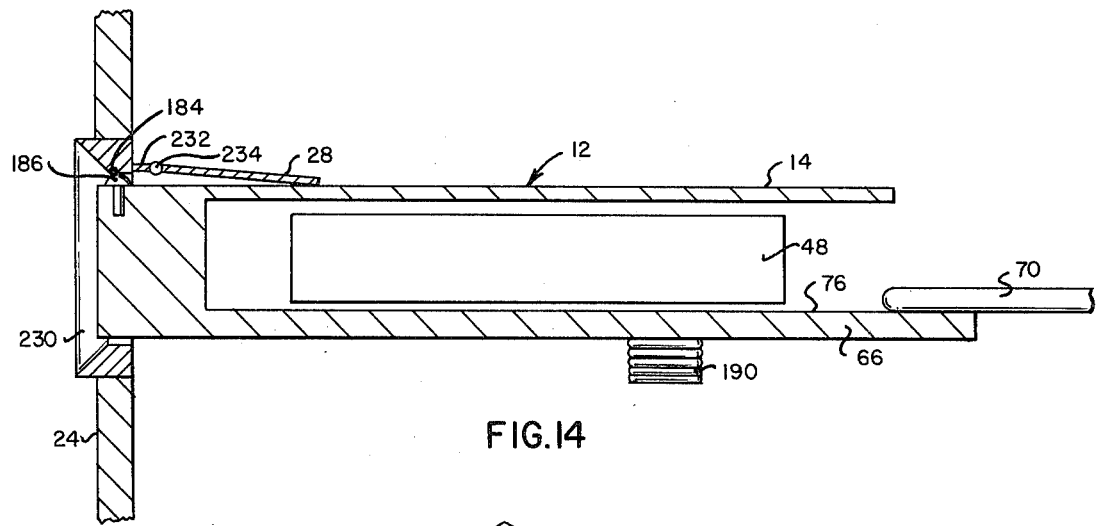
FIG. 14 is a sectional view of the tape cartridge and a portion of the transport showing further details of the arrangement for providing desired height registration of the tape cartridge.

As described in detail hereafter in connection with FIGS. 13 and 14, the cartridge 12 when installed is precisely vertically positioned so as to achieve precise registration with the head assembly 64. The precise vertical positioning of the cartridge 12 is provided by an arrangement which includes a pair of horizontally disposed rods 68 and 70 extending from mounting blocks 72 and 74 respectively which are formed as part of the deck 16. The base 66 of the enclosed housing 14 of the tape cartridge 12 has a top surface 76 which is forced upwardly at a single point and into engagement with the rods 68 and 70 as described in detail hereafter. This action combines with registration of an opposite rear portion of the top of the tape cartridge 12 as described hereafter to provide the desired precise 3 point vertical positioning of the cartridge 12 when in the installed, operative position.

Figure 17:
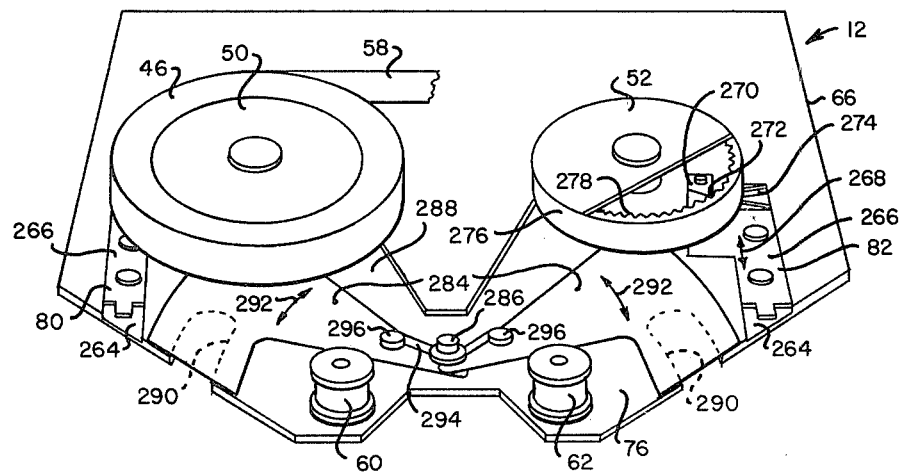
FIG. 17 is a perspective view of the tape cartridge of FIG. 14 with the top removed to show the interior details.

The tape cartridge 12 includes a pair of reel locks 80 and 82 which are described in detail hereafter in connection with FIG. 17. The locks 80 and 82 respectively lock the reels 50 and 52 against rotation except when the cartridge 12 is installed in the transport 10. As the cartridge 12 is slid along the bosses 18 and 20 during installation thereof in the transport 10, an opposite pair of unlocking blades 84 and 86 shown in FIG. 2 respectively engage the reel locks 80 and 82 to unlock the reels 50 and 52. The unlocking blades 84 and 86 are mounted on mounting blocks 88 and 90 respectively which are formed as part of the deck 16.

Figure 3:
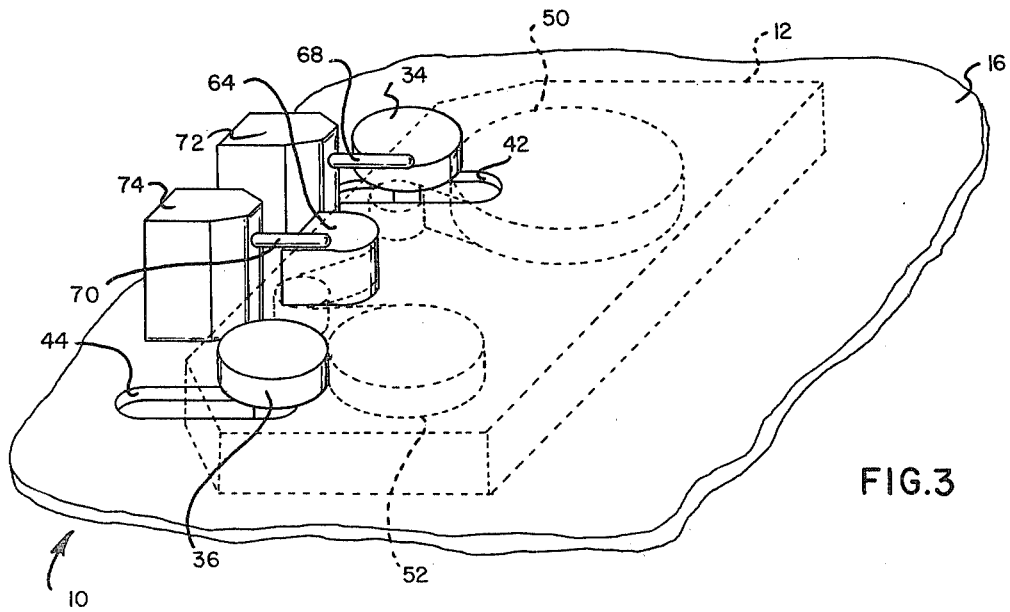
FIG. 3 is a perspective view of a portion of the transport of FIG. 1 with the cartridge shown in dotted outline.

FIG. 3 is a perspective view of a portion of the transport 10, which view is from the opposite side of the transport 10 from the views of FIGS. 1 and 2. The tape cartridge 12 and the reels 50 and 52 are shown in dotted outline in FIG. 3 for clarity of illustration of certain of the components such as the magnetic head assembly 64, the capstans 34 and 36, and the rods 68 and 70. The unlocking blades 84 and 86 and their associated mounting blocks 88 and 90 are omitted from FIG. 3.

Figure 4:
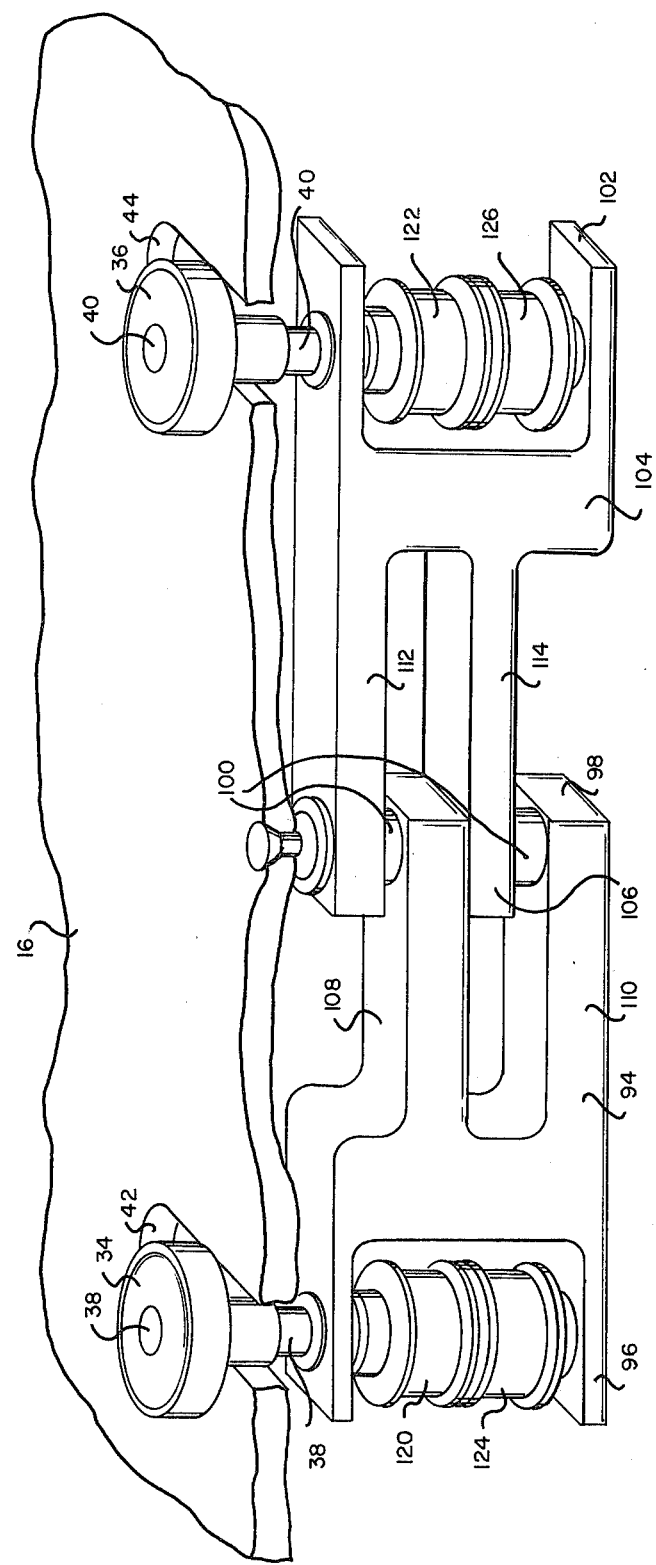
FIG. 4 is a perspective, broken away view of a portion of the transport of FIG. 1 showing the pivoting bracket arrangement for mounting the tape drive capstans.

FIG. 4 illustrates the manner in which the capstans 34 and 36 and the capstan shafts 38 and 40 are mounted. The shaft 38 which is vertically disposed is rotatably coupled to a first elongated bracket 94 at a first end 96 of the bracket 94. An opposite second end 98 of the first elongated bracket 94 is pivotally mounted on the deck 16 by a common bracket mounting shaft 100. The shaft 40 is vertically disposed and is rotatably mounted on a first end 102 of a second elongated bracket 104. The bracket 104 is pivotally mounted on the deck 16 at an opposite second end 106 thereof. The second end 106 of the second elongated bracket 104 is pivotally coupled to the common bracket mounting shaft 100. The first elongated bracket 94 is formed into two spaced-apart fingers 108 and 110 at the second end 98 thereof. Likewise, the second elongated bracket 104 is formed into two spaced-apart fingers 112 and 114 at the second end 106 thereof. The fingers 108 and 110 are interleaved with the fingers 112 and 114 where they receive the common bracket mounting shaft 100 and dispose the brackets 94 and 104 in a symmetrical arrangement.

The first elongated bracket 94 is capable of rotation about the common bracket mounting shaft 100 to enable the shaft 38 to move back and forth within the slot 42. In like fashion the second elongated bracket 104 is capable of pivoting about the common bracket mounting shaft 100 so that the shaft 40 can move back and forth within the slot 44.

A first pair of pulleys 120 and 122 are respectively journaled about the shafts 38 and 40. A second pair of pulleys 124 and 126 is also respectively journaled about the shafts 38 and 40. As described hereafter the pulleys 120 and 124 are coupled to the shaft 38 by unidirectional clutches operative to couple the pulleys 120 and 124 to the shaft 38 when the pulleys 120 and 124 are rotated in a like first direction. The clutches are such that the pulleys 120 and 124 uncouple from and "free-wheel" relative to the shaft 38 when rotated in an opposite, second direction. The pulleys 122 and 126 are coupled to the shaft 40 by unidirectional clutches which engage to couple the pulleys 122 and 126 to the shaft 40 when such pulleys are rotated in the second direction. Rotation of the pulleys 122 and 126 in the opposite first direction causes the clutches to disengage so that the pulleys 122 and 126 "free-wheel".

The first direction is defined by clockwise rotation of the capstans 34 and 36 looking down on the deck 16 as in FIG. 2 for example. The second direction is defined by counterclockwise rotation of the capstans 34 and 36 looking down on the deck 16. The pulley 120 has a given diameter and the pulley 122 has a diameter slightly larger than the given diameter. The pulley 126 has a diameter equal to the given diameter and the pulley 124 has a diameter slightly larger than the given diameter and equal to the diameter of the pulley 122.

Figure 5:
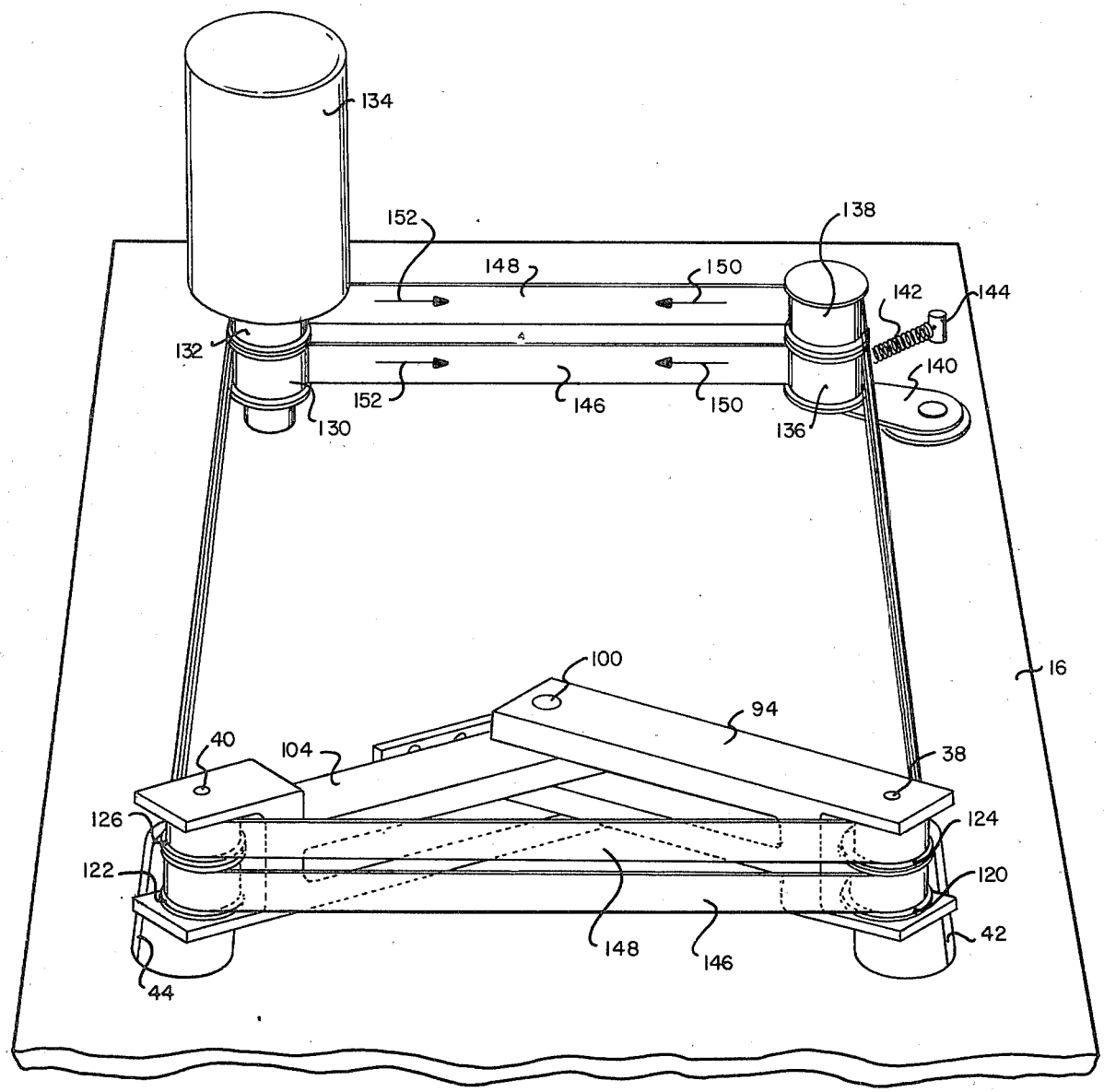
FIG. 5 is a perspective view of the underside of the transport of FIG. 1 showing the complete arrangement for driving the capstans.

The complete arrangement for driving the pulleys 120, 122, 124 and 126 is shown in FIG. 5 which is a view of the underside of the deck 16. In addition to the elongated brackets 94 and 104 which mount the pulleys 120, 122, 124 and 126, there are a pair of pulleys 130 and 132 of equal diameter and fixedly coupled to the shaft of a drive motor 134. An additional pair of idler pulleys 136 and 138 is rotatably mounted on one end of an idler arm 140 pivotably coupled to the underside of the deck 16 at an opposite end thereof from the pulleys 136 and 138. A spring 142 is coupled between a lug 144 mounted on the underside of the deck 16 and the end of the idler arm 140 which mounts the pulleys 136 and 138. The spring 142 is biased to urge the pulleys 136 and 138 in a direction toward the lug 144.

A first endless belt 146 extends around and engages the pulleys 120, 122, 130 and 136. A second endless belt 148 extends around and engages the pulleys 124, 126, 132 and 138. When the motor 134 which is bidirectional in nature is driven in the first direction, the belts 146 and 148 are both driven in a direction shown by arrows 150. When the motor 134 is driven in the opposite or second direction, the belts 146 and 148 are both driven in a direction shown by arrows 152.

When the motor 134 begins to drive the belts 146 and 148 in the second direction as shown by the arrows 152 in FIG. 5, the pulleys 122 and 126 begin to rotate in the second direction. Because both belts 146 and 148 move at the same speed and the pulley 122 is of larger diameter than the pulley 126, the pulley 126 rotates in the second direction at a slightly faster rate than the pulley 122. The clutch which mounts the pulley 126 on the shaft 40 engages and the pulley 126 begins to drive the shaft 40 and the capstan 36 in the second direction. Because the shaft 40 rotates at a slightly faster rate than the pulley 122, the clutch mounting the pulley 122 on the shaft 40 slips and does not engage. With the capstan 36 rotating in the second direction, the associated reel 52 is rotated in a direction to take up the tape 58 thereon. If the tape 58 is slack so as not to rotate the opposite reel 50 and thereby the capstan 34 as the tape is taken up on the reel 52, the clutches mounting the pulleys 120 and 124 on the shaft 38 slip as the belts 146 and 148 are driven. Eventually, the slack in the tape 58 is taken up and the tape 58 begins to rotate the reel 50 as the tape is unwound therefrom. As the reel 50 rotates, the capstan 34 and associated shaft 38 are caused to rotate in the second direction at essentially the same angular rate as the shaft 40 and the pulley 126. The pulley 120 has the same diameter as and therefore rotates at the same rate as the pulley 126. However, the pulley 124 has a larger diameter than the pulley 126. Because the pulleys 124 and 126 are engaged by the same belt 148, the pulley 124 rotates at a slower rate than the pulley 126. This causes the clutch mounting the pulley 124 on the shaft 38 to engage so as to couple the pulley 124 to the shaft 38 and the capstan 34. The slightly lower rotational speed of the pulley 124 slows down or drags the tape supplying reel 50 relative to the takeup reel 52, thereby creating a desired amount of tension in the tape 58.

With the belts 146 and 148 being driven in the second direction as just described, the reel 50 supplying the tape 58 continues to exert a drag on the tape due to the difference in size of the pulleys 124 and 126 to provide a constant, controlled tape tension. Should the supply reel 50 tend to overshoot for any reason such as inertia, the larger pulley 124 drives the smaller pulley 126 faster via the belt 148 until the tape between the reels 50 and 52 restricts further increases in speed, thereby creating tape tension. The pulley 126 remains coupled to the shaft 40 via the clutch mounting the pulley 126 on the shaft 40, so that the takeup capstan 36 always keeps ahead of the supply capstan 34 to maintain tape tension. This prevents the formation of an unwanted loop in the tape 58 during various different operating conditions including substantial acceleration and deceleration.

It will be seen that the various unidirectional clutches which mount the pulleys 120, 122, 124 and 126 on the shafts 38 and 40 perform an overriding function to insure that any initial tape slack is taken up, that constant tape tension is thereafter maintained and that slack or a tape loop which would otherwise result from inertia under certain operating conditions is prevented.

When the motor 134 begins to drive the belts 146 and 148 in the first direction as represented by the arrows 150 in FIG. 5, the pulley 120 is coupled to the shaft 38 and the capstan 34 rotates the reel 50 in a direction to begin taking up tape thereon. The pulley 124 is not coupled to the shaft 38 because of the larger diameter thereof. When any slack in the tape 58 is taken up, the pulley 122 is coupled to the shaft 40, and because of its diameter which is larger than that of the pulley 120 slows down the capstan 36 accordingly to provide the desired constant tension in the tape 58. Should the reel 52 which is operating as the supply reel begin to overshoot, the pulley 122 causes the pulley 120 and the capstan 34 to be driven at a greater rate to compensate and prevent the formation of a tape loop.

Figure 6:
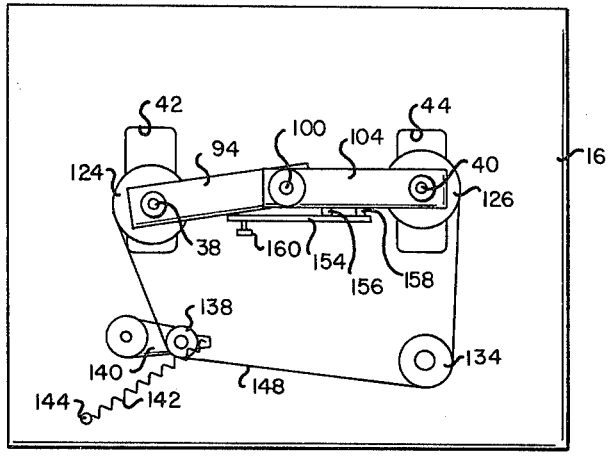
FIG. 6 is a bottom view of the transport of FIG. 1 showing the complete arrangement for driving the capstans.

FIG. 6 is a bottom view of the deck 16 showing the motor 134, the elongated brackets 94 and 104 and the various pulleys. As best seen in FIG. 6 an elongated limit member 154 is mounted on the side of the second elongated bracket 104 by a pair of spacers 156 and 158. At the opposite end of the elongated limit member 154 from the spacers 156 and 158, a screw 160 extends through and is threaded to the member 154. With no tape cartridge inserted in the transport 10, the elasticity of the belts 146 and 148 combines with the urging of the spring 142 to pull the shaft 38 toward the idler arm 140 and to pull the shaft 40 toward the motor 134. If unrestrained, the elongated brackets 94 and 104 would pivot far enough to relax the tension in the belts 146 and 148 to such an extent that the belts might become misaligned relative to or come completely off of the pulleys. The elongated limit member 154 prevents this by limiting the pivoting movement of the elongated brackets 94 and 104 so that adequate tension is maintained in the belts 146 and 148. The amount of pivoting movement of the elongated brackets 94 and 104 in this direction can be adjusted by turning the screw 160.

The spring 142 coupled to the idler arm 140 constantly urges the pulleys 136 and 138 in a direction to maintain the belts 146 and 148 taut against the various pulleys. However, if the belts 146 and 148 are provided with sufficient elasticity, it may be possible to eliminate the idler arm 140 and pivotably mount the pulleys 136 and 138 in a fixed position on the deck 16.

When the tape cartridge 12 is installed in the transport 10, the tape packs 46 and 48 on the reels 50 and 52 bear against the capstans 34 and 36 with a predetermined amount of force which results in rotation of the elongated bracket 94 relative to the bracket 104 so as to pull the bracket 94 some distance away from the end of the screw 160 against the urging of the spring 142 and the elasticity of the belts 146 and 148. The resulting tension insures adequate engaging contact between the capstans 34 and 36 and the tape packs 46 and 48.

Figure 8:
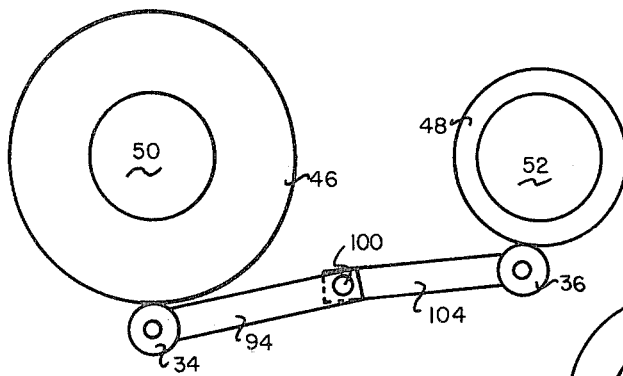
FIGS. 7, 8 and 9 are three different plan views of the pivoting bracket arrangement of FIG. 4 for three different conditions of tape pack on the reels of the transport of FIG. 1.
Figure 7:
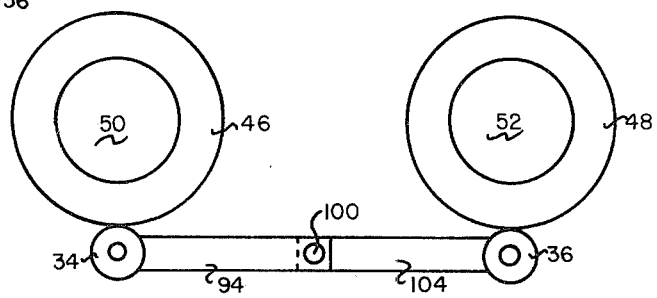
Figure 9:
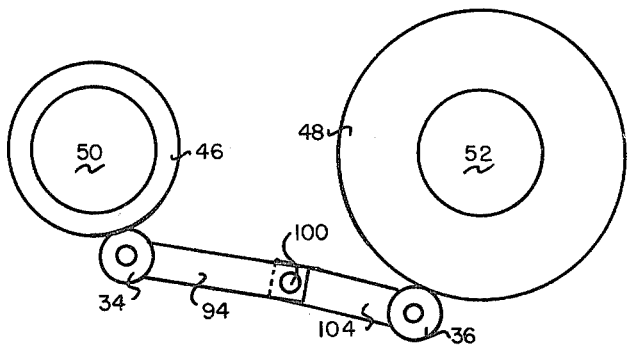

FIGS. 7, 8 and 9 depict the manner in which the elongated brackets 94 and 104 move to reposition the capstans 34 and 36 for varying relative sizes of the tape packs 46 and 48. In FIG. 7 the tape packs 46 and 48 on the reels 50 and 52 are approximately equal in size. In such situation the elongated brackets 94 and 104 are almost parallel to the front of the transport 10. FIG. 8 depicts the condition in which the tape pack 46 on the reel 50 is considerably larger than the tape pack 48 on the reel 52. When this condition occurs the elongated bracket 94 and the included capstan 34 are required to move downwardly as viewed in the figure, while, conversely, the elongated bracket 104 and the included capstan 36 are required to move upwardly as so viewed. The opposite situation is depicted in FIG. 9 where the tape pack 48 has become substantially larger than the tape pack 46, resulting in the elongated bracket 94 and the included capstan 34 being moved upwardly as so viewed and the elongated bracket 104 and included capstan 36 being moved downwardly.

Figure 10:
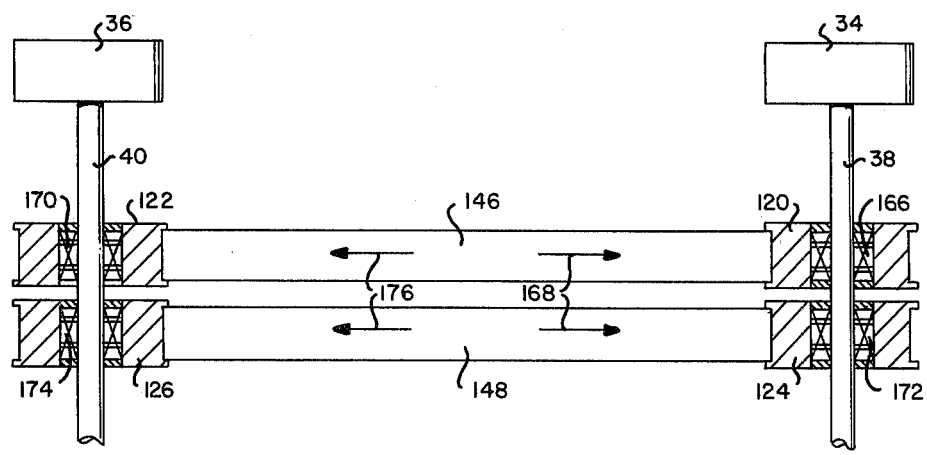
FIG. 10 is a sectional view of a portion of the arrangement shown in FIG. 5.

FIG. 10 is a sectional view of the pulleys 120, 122, 124 and 126 together with the shafts 38 and 40 and the capstans 34 and 36. The pulley 120 is mounted on the shaft 38 by an overriding unidirectional clutch 166. The clutch 166 engages to couple the pulley 120 to the shaft 38 when the belts 146 and 148 are driven in a direction represented by arrows 168 and the shaft 38 is either at rest or rotating at a slower speed than the pulley 120. The pulley 122 is mounted on the shaft 40 by an overriding unidirectional clutch 170 which engages in a rotational direction opposite that of the clutch 166. The pulley 124 is mounted on the shaft 38 by a clutch 172 which engages in the same rotational direction as the clutch 166 and slips or free-wheels in the opposite direction. The pulley 126 is mounted on the shaft 40 by a clutch 174 which engages in the same direction as does the clutch 170. When the belts 146 and 148 are driven in a direction opposite that of the arrows 168 as represented by a pair of arrows 176, the clutches 170 and 174 tend to couple the pulleys 122 and 126 to the shaft 40 if the shaft 40 is at rest or rotating at a slower speed.

The arrangement for maintaining a constant tension on the tape and preventing the formation of unwanted loops in the tape have been described herein in connection with a tape cartridge system having adjustable capstans. However, it should be understood that the principles of bidirectional tape tension are applicable to other types of tape decks as well as including those of coaxial or coplanar configurations.

Figure 11:
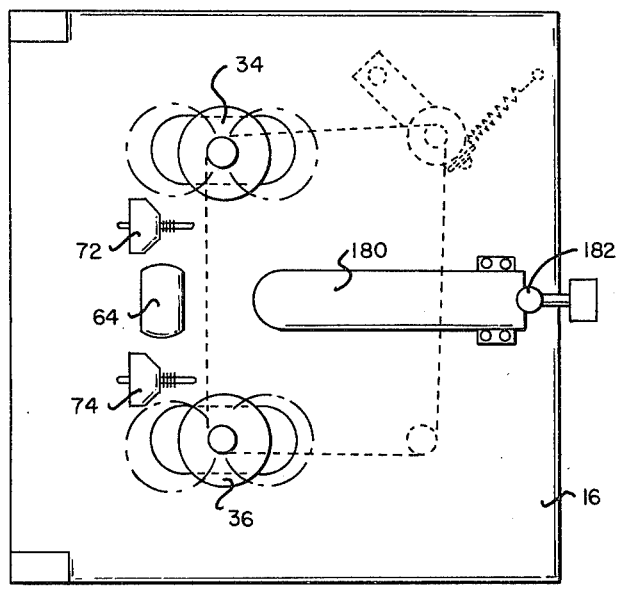
FIG. 11 is a top view of a portion of the transport of FIG. 1.
Figure 12:
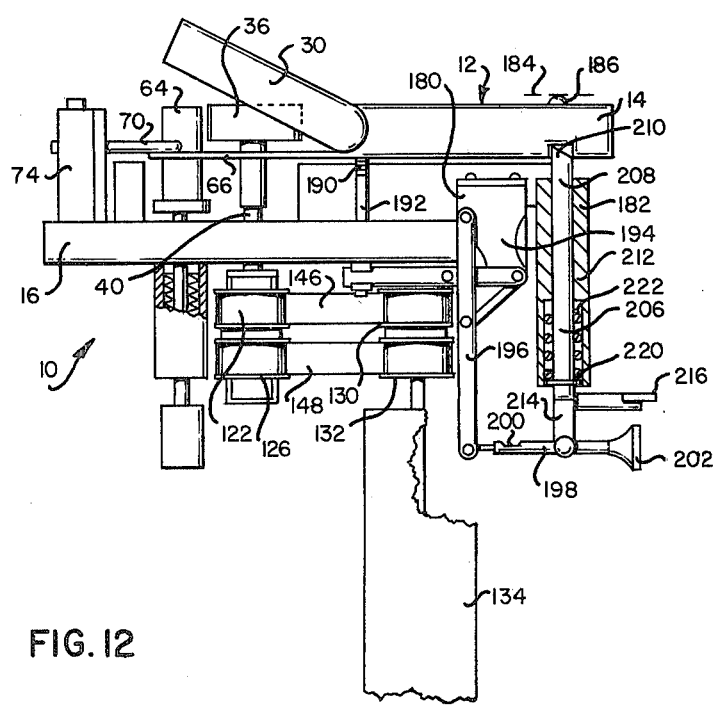
FIG. 12 is a side view of a portion of the transport of FIG. 1.

FIGS. 11 and 12 depict further details of the transport 10 including a camming arrangement 180 and a locking arrangement 182. When the tape cartridge 12 is installed, the camming arrangement 180 is adjusted so as to bear against the underside of the cartridge 12 and thereby hold the cartridge in the proper precise vertical position against 3 reference points. At the same time the locking arrangement 182 is employed to lock the cartridge 12 in the installed, operative position so that the force of the capstans 34 and 36 against the tape packs 46 and 48 cannot partially eject the cartridge 12. As previously noted the precise vertical height of the front end of the cartridge 12 is achieved by forcing the top surface 76 of the bottom 66 of the cartridge housing 14 against the rods 68 and 70 which define the spaced apart reference points. The rear end of the cartridge 12 is referenced to a third reference point in the form of a surface within a cartridge receiving slot in the front panel 24, which surface is represented by a dashed line 184 in FIG. 12. A rounded bead 186 at the top of the rear of the cartridge 12 bears against the surface represented by the line 184 to achieve proper vertical positioning of the rear portion of the cartridge 12. The bead 186 can alternatively be mounted on the surface 184 so as to bear against the top surface of the cartridge 12.

The cartridge 12 is held against the rods 68 and 70 and the surface represented by the dashed line 184 by a coil spring 190 which engages the underside of the cartridge 12. The spring 190 is mounted on the upper end of a shaft 192 which extends upwardly from and is mounted on a pivotally interconnected arrangement of levers 194. The lever arrangement 194 has a downwardly extending lever 196 having a lower end coupled to the end of a control rod 198. The control rod 198 which has a notch 200 in the upper surface thereof adjacent the lever 196 has a knob 202 mounted on the end thereof opposite the lever 196. The lever arrangement 194 is a conventional mechanical advantage device in which a given movement of the lower end of the lever 196 produces a smaller movement of the shaft 192. Movement of the lower end of the lever 196 to the left as viewed in FIG. 12 results in a smaller but corresponding upward movement of the shaft 192. Conversely movement of the lower end of the lever 196 to the right as viewed in FIG. 12 results in a corresponding but smaller downward movement of the shaft 192.

When the tape cartridge 12 is in the installed, operative position, the cartridge is pressed against the rods 68 and 70 and the surface represented by the dashed line 184 for proper height registration thereof by pushing the knob 202 so as to pivot the lower end of the lever 196 to the left as viewed in FIG. 12. This causes the lever arrangement 194 to respond with an upward movement of the shaft 192 so as to press the coil spring 192 against the underside of the tape cartridge 12. Conversely, a movement of the knob 202 so as to pivot the lower end of the lever 196 to the right as viewed in FIG. 12 causes the lever arrangement 194 to lower the shaft 192 and its included coil spring 190 and thereby release the cartridge 12 from the rods 68 and 70 and the surface represented by the dashed line 184.

The camming arrangement 180 provides a final vertical movement and alignment of the cartridge 12. A coarse alignment is initially provided by the bosses 18 and 20 and the conical tips of the rods 68 and 70.

As previously noted, when the cartridge 12 is in the engaged, operative position, the cartridge 12 is locked in such position by the locking arrangement 182. As shown in FIG. 12, the locking arrangement 182 includes a vertically disposed, vertically slidable locking rod 206 having an upper end 208 adapted to engage and latch within an aperture 210 in the bottom of the tape cartridge 12. The locking rod 206 which is mounted within a cylinder 212 for vertically slidable movement has a lower end 214 thereof coupled to a control knob 216.

A coil spring 220 surrounding a portion of the locking rod 206 and disposed within a recess in the interior of the cylinder 212 bears against the lower end of the cylinder 212 and a pin 222 in the locking rod 206 to normally urge the locking rod 206 in an upward direction. When a tape cartridge 12 is not inserted in the transport 10, the knob 202 of the camming arrangement 180 is pulled out so as to hold the coil spring 190 in a lowered position. In this position the notch 200 in the upper surface of the control rod 198 is positioned beneath the lower end 214 of the locking rod 206. The action of the coil spring 220 against the pin 222 holds the locking rod 206 in a raised position. If insertion of a tape cartridge 12 into the transport 10 is now begun, the bottom 66 of the cartridge 12 depresses the upper end 208 of the locking rod 206 so as to move the rod 206 downwardly against the resistance of the coil spring 220 by an amount sufficient to permit the cartridge 12 to be inserted into the transport 10. The resulting downward movement of the rod 206 forces the lower end 214 into the notch 200 in the control rod 198. When the cartridge 12 reaches the installed, operative position, the upper end 208 of the locking rod 206 snaps into the aperture 210 under the urging of the coil spring 220. Precise vertical positioning of the cartridge 12 is then accomplished by pushing in on the knob 202 to rotate the lower end of the lever 196 to the left as viewed in FIG. 12 so as to raise the shaft 192 and press the coil spring 190 against the underside of the cartridge 12. With the locking rod 206 in the raised or locked position in which the upper end 208 thereof resides within the aperture 210, the lower end 214 of the rod 206 resides against the upper surface of the control rod 198. This allows the knob 202 to be pushed in and thereby cam the coil spring 190 against the underside of the cartridge 12.

The notch 200 in the control rod 198 and the relationship of the locking rod 206 to the control rod 198 combine with a microswitch 224 to provide a safety feature.

When the knob 202 is pushed in so as to wedge the cartridge 12 between the coil spring 190 and the rods 68 and 70 and the surface represented by the dashed line 184, the transport 10 is capable of driving the magnetic tape 58 within the cartridge 12 at very high speeds. Should the control knob 216 be pushed down either accidentally or intentionally so as to remove the upper end 208 of the locking rod 206 from the aperture 210 and thereby unlock the cartridge 12 during such conditions, the results could be tape breakage or other catastrophic condition such as unreeling of the tape. Such inadvertent unlocking of the tape cartridge 12 is prevented by the lower end 214 of the locking rod 206 which resides against the upper surface of the control rod 198 with the knob 202 pushed into the camming engagement position as shown in FIG. 12. It is only when operation of the cartridge 12 is terminated and the knob 202 is pulled out to uncam the cartridge 12 and turn off the power via the microswitch 224 that the cartridge may be unlocked. With the knob 202 pulled out to uncam the cartridge 12, the notch 200 is disposed below the lower end 214 of the locking rod 206. In such condition downward movement of the control knob 216 lowers the lower end 214 into the notch 200 against the urging of the coil spring 220 as the upper end 208 of the locking rod 206 is removed from the aperture 210 to unlock the cartridge 12. The microswitch 224 prevents the power from being turned on unless the cartridge 12 is in the fully installed position.

FIG. 13 is a view of a portion of the transport 10 from the front thereof with the front panel 24 removed. As such FIG. 13 shows the manner in which the tape cartridge 12 is received by the bosses 18 and 20 and the manner in which the cartridge 12 is vertically referenced by the rods 68 and 70 and the surface represented by the dashed line 184. Each of the bosses 18 and 20 has a plurality of rollers 226 mounted thereon. Each of the rollers 226 is mounted on the outside of one of the bosses 18 and 20 by a pin 228 and extends through a slot in the boss to the inside of the boss where it contacts and guides the cartridge 12 as the cartridge is inserted.

As shown in FIG. 14 the front panel 24 of the transport 10 has a doorframe 230 mounted therein. The doorframe 230 defines a slot for receiving the tape cartridge 12. The door 28 is coupled to the top of the doorframe 230 at the inside thereof by a thin strip 232 forming part of a hinge 234. The door 28 which normally dangles downwardly in a vertical position to close off the opening defined by the doorframe 230 is pushed upwardly and out of the way upon insertion of the cartridge 12 as seen in FIG. 14.

The lower edge of the top portion of the doorframe 230 defines the height referencing surface corresponding to the dashed line 184. With the tape cartridge 12 installed, the rounded bead 186 bears against this surface as the tape cartridge 12 is forced upwardly by the coil spring 190 of the camming arrangement 180. The manner in which the top surface 76 of the base 66 of the enclosed housing 14 of the tape cartridge 12 is forced against the rods 68 and 70 to precisely reference the height of the front portion of the cartridge 12 is also illustrated in FIG. 14.

Figure 15:
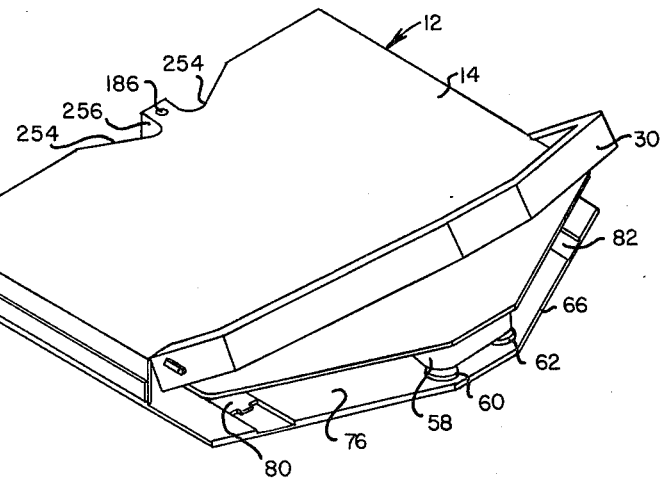
FIG. 15 is a perspective view of the tape cartridge of FIG. 1.
Figure 16:
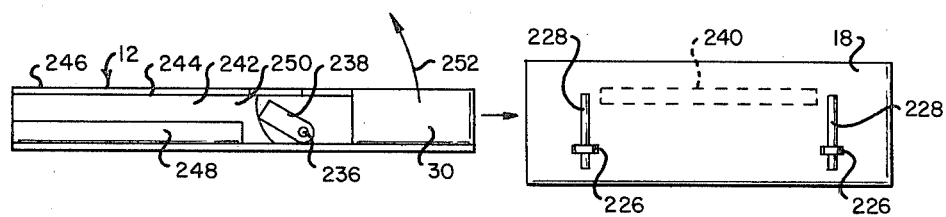
FIG. 16 is a side view of the tape cartridge of FIG. 15 together with one of the guides of the transport of FIG. 1.

FIG. 15 is a perspective view of the tape cartridge 12 showing the front door 30 in the raised position which occurs when the cartridge 12 is installed in the transport 10. The manner in which the front door 30 of the cartridge housing 14 is automatically raised to the open position upon installation of the cartridge 12 in the transport 10 is illustrated in FIGS. 15 and 16. The front door 30 is pivotally coupled to the housing 14 at the opposite ends thereof along a common axis. A pin 236 disposed along the common axis pivotally couples the left end of the front door 30 to the left side of the housing 14. A similar pin (not shown) pivotally couples the righthand end of the front door 30 to the right side of the housing 14. The pin 236 extends through a camming lever 238 formed on the outside of the front door 30 at the left end thereof. The righthand end of the front door 30 is similarly provided with a camming lever (not shown). The camming lever 238 is inclined at an angle relative to the horizontal when the front door 30 is closed as shown in FIG. 16. The inside surface of each of the bosses 18 and 20 adjacent the top thereof is provided with an elongated protrusion 240. The protrusion 240 on the inside surface of the boss 18 is shown in dotted outline in FIG. 16. The elongated protrusions 240 are configured to fit into grooves 242 formed in the opposite edges of the tape cartridge 12. Each of the grooves 242 is formed by an edge 244 of a top 246 of the cartridge housing 14 and by an outwardly extending ridge 248 formed along a portion of an edge 250 of the cartridge housing 14.

As the tape cartridge 12 is inserted into the tape transport 10, the rollers 226 in the opposite bosses 18 and 20 engage the opposite edges of the cartridge 12 such as the edge 250 immediately below the ridge 248 to help guide the cartridge 12 into place. At the same time the elongated protrusions 240 move along the cartridge edges just beneath the edges 244 where they eventually encounter and engage the camming levers 238. As the tape cartridge 12 continues to be pushed into place in the transport 10, the elongated protrusions 240 force the camming levers 238 away from the edges 244, causing the front door 30 to pivot upwardly about the opposite pins including the pin 236 as represented by an arrow 252.

It will be seen in FIG. 15 that the rear of the tape cartridge 12 is provided with a pair of recesses 254 on opposite sides of the rounded bead 186. The recesses 254 define a lug 256 at the back edge of the cartridge housing 14 which is easily grasped to facilitate removal of the tape cartridge 12 from the transport 10 and also removal of the cartridge 12 from various cartridge storage facilities.

When the tape cartridge 12 is removed from the transport 10 such as by grasping the lug 256 and pulling the cartridge 12 outwardly through the doorframe 230, a point is eventually reached at which the ends of the elongated protrusions 240 pass beyond the camming levers 238. When this occurs an internal spring (not shown) pivots the front door 30 downwardly and into the closed position. With the front door 30 in the closed position, the interior of the cartridge housing 14 with the included magnetic tape 58 is generally sealed off against dust, dirt, foreign objects and the like.

The tape cartridge 12 is shown in FIG. 17 with all but the base 66 of the enclosed housing 14 removed to better illustrate the interior details of the cartridge 12. As previously noted the cartridge 12 is provided with reel locks 80 and 82. The reel locks 80 and 82 are of like configuration, with the lock 82 being shown in detail in FIG. 17. The bottom 66 of the cartridge housing 14 has a pair of opposite grooves 264 in the top surface 76 thereof. Each of the grooves 264 receives a relatively thin, flat locking bracket 266. Each locking bracket 266 is capable of sliding forward and backward within the groove 264 as represented by an arrow 268. Mounted adjacent the rear end of each locking bracket 266 is an upstanding tab 270 having a relatively sharp edge 272 at the front thereof. A spring 274 resides in a back portion of the groove 264 between the back of the locking bracket 266 and the back of the groove 264.

Each of the reels 50 and 52 has a generally circular outer periphery 276. The inner surface of the outer periphery 276 is provided with a plurality of tooth-like protrusions 278. The spring 274 normally resiliently urges the locking bracket 266 in a direction toward the front edges of the cartridge 12, causing the sharp edge 272 of the tab 270 to engage the inner surface of the reel 52 between two of the tooth-like protrusions 278 thereof and thereby prevent rotation of the reel 52. The reel lock 80 functions in like fashion to normally lock out rotation of the reel 50. This prevents unwanted rotation of the reels 50 and 52 when the cartridge 12 is not installed in the transport 10.

When the tape cartridge 12 is installed in the transport 10 by inserting the cartridge through the doorframe 230 in the front panel 24 and pushing the cartridge along the opposite bosses 18 and 20, a point is reached at which the unlocking blades 84 and 86 shown in FIGS. 1 and 2 engage the front edges of the locking brackets 266 within the reel locks 80 and 82. As the tape cartridge 12 is pushed further into the transport 10 so as to reach the installed, operative position, such continued movement results in the blades 84 and 86 pushing the brackets 266 toward the back of the cartridge 12 against the resistance of the springs 274. When this happens, the tabs 270 are moved away from the tooth-like protrusions 278, and the reels 50 and 52 are free to rotate as the tape packs 46 and 48 thereon are driven by the capstans 34 and 36.

As previously noted the pulleys 120, 122, 124 and 126 cooperate with the clutches 166, 170, 172 and 184 to maintain the tape in substantially constant tension during operation. Moreover the nature of such arrangement is such that any individual movement of a capstan 34 or 36, a pulley 120, 122, 124 or 126 or a belt 146 or 148 has the effect of tightening the tape 58 across the guides 60 and 62. This is of particular importance when the cartridge 12 is inserted in the deck 16 since the sequence of contact of the capstans 34 and 36 with the reels 50 and 52 and the direction of rotation of the capstans 34 and 36 cannot be controlled after the reel locks 80 and 82 are released.

As previously noted, when the front cover 30 of the tape cartridge 12 is closed, the enclosed housing 14 of the cartridge 12 seals the interior thereof against dust and other foreign objects. This is provided for by the fact that when the cartridge 12 is not being used, there are no exposed slots or other apertures in the cartridge housing 14 aside from a slot (not shown) in the cartridge base 66 which may be required to accommodate a movable head. At the same time, provision must be made for the capstan shafts 38 and 40 as they move along the slots 42 and 44 in the deck 16 to accommodate the varying tape packs 46 and 48. This is accomplished by an opposite pair of dust covers 284 pivotally mounted on the bottom 66 by a common pin 286. The dust covers 284 reside within a recess 288 in the top surface 76 of the bottom 66. The dust covers 284 normally cover and seal opposite slots 290 in the base 66 which are shown in dotted outline in FIG. 17. The opposite slots 290 accommodate the capstan shafts 38 and 40 as the shafts move inwardly toward the reels 50 and 52.

The dust covers 284 which are rotatable about the common pin 286 as shown by arrows 292 are normally held in the positions shown in FIG. 17 so as to close off the slots 290 by a spring 294. The spring 294 is wrapped around the common pin 286 and extends outwardly on opposite sides of the pin 286 so as to engage tabs 296 on the dust covers 284. At the same time the dust covers 284 are capable of independently pivoting away from the front edge of the tape cartridge 12 against the urging of the spring 294 when engaged by non-rotating covers for the capstan shafts 38 and 40 so as to allow the shafts to move back and forth through the slots 290 as the tape packs 46 and 48 vary. Upon removal of the tape cartridge 12 from the transport 10, the dust covers 284 assume the position shown in FIG. 17 under the urging of the spring 294 to close off the slots 290 in the bottom 66 and thereby seal the enclosed housing 14 of the cartridge 12.

Figure 18:
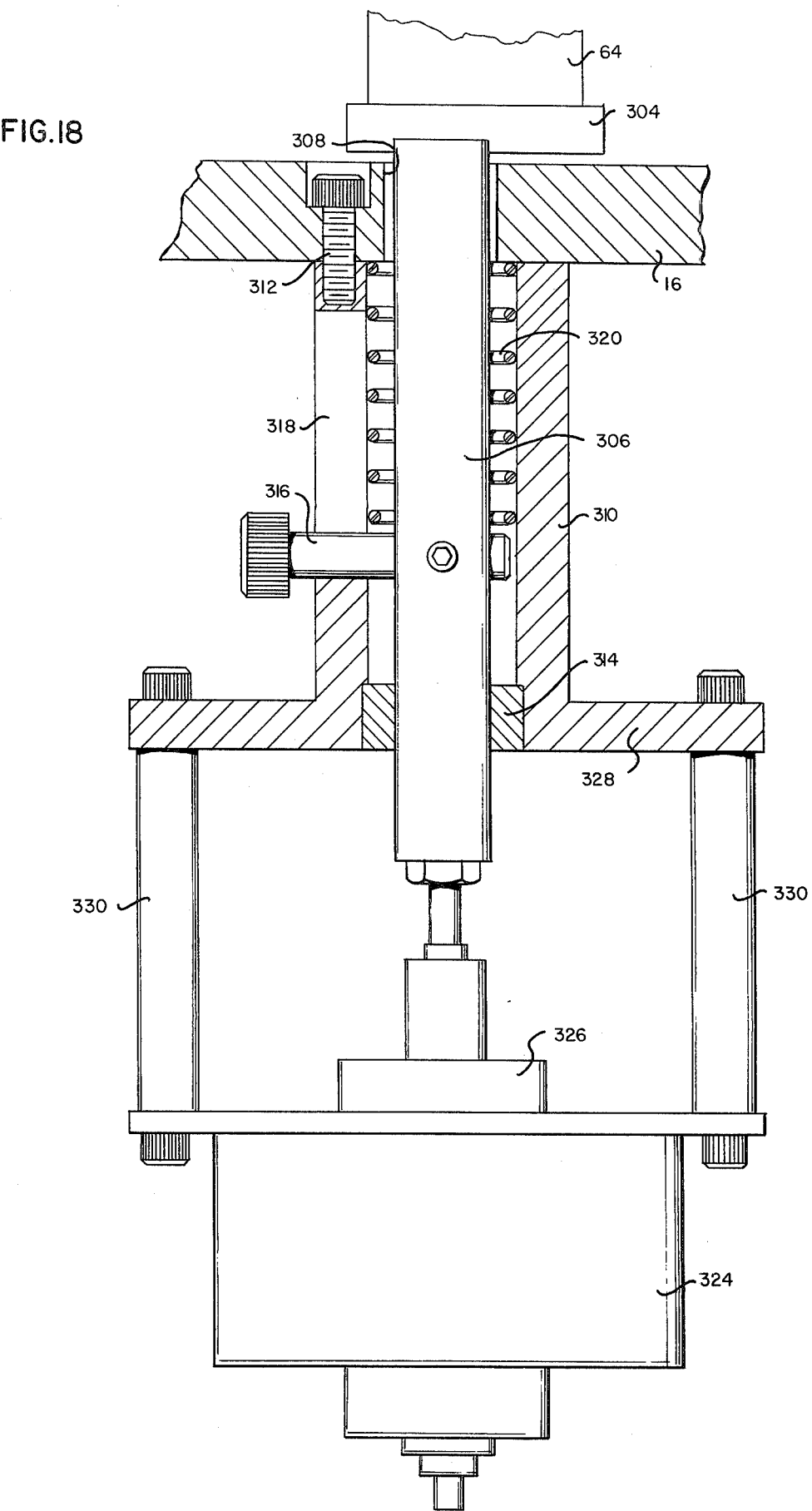
FIG. 18 is a side view, partly in section, of an arrangement for positioning the magnetic head in the transport of FIG. 1.

FIG. 18 shows an arrangement in accordance with the invention for precisely vertically positioning the magnetic head assembly 64. As seen in FIG. 18 the head assembly 64 is mounted on a support plate 304. The support plate 304 is secured to the top end of a vertically disposed shaft 306 extending through an aperture 308 in the deck 16 to the underside of the deck 16. The shaft 306 is received within the hollow interior of a hollow, generally cylindrical barrel 310 coupled to the underside of the deck 16 by bolts 312. A bushing 314 mounted within the interior of the barrel 310 at the lower end thereof slidably receives the lower end of the shaft 306, permitting the shaft 306 and the attached support plate 304 to undergo vertical movement.

A pin 316 is coupled to and extends outwardly from the shaft 306 and resides within a vertical slot 318 in the side of the barrel 310. A coil spring 320 surrounds the shaft 306 within the barrel 310 and extends between the pin 316 and the underside of the deck 16. The coil spring 320 pushes against the pin 316 so as to normally resiliently urge the shaft 306 and its included support plate 304 downwardly to a lowermost position in which the pin 316 resides within the bottom of the vertical slot 318 in the barrel 310.

The support plate 304 is raised from its lowermost position against the urging of the coil spring 320 so as to locate the magnetic head assembly 64 at a desired vertical position relative to the magnetic tape 58 by a stepper motor 324 and a worm drive 326. The barrel 310 includes a flange 328 at the lower end thereof to which the stepper motor 324 is coupled by a plurality of spacers 330. The shaft of the stepper motor 324 is coupled to the worm drive 326 which in turn is coupled to the lower end of the shaft 306. As the stepper motor 324 is advanced in one direction, the worm drive 326 responds by raising the shaft 306 and thereby the magnetic head assembly 64 against the urging of the coil spring 320, the spring 320 compensating for backlash from the worm drive 326. Conversely, as the stepper motor 324 is stepped in an opposite direction, the worm drive 326 responds by allowing the shaft 306 and thereby the magnetic head assembly 64 to be lowered. The stepper motor 324 and the associated worm drive 326 allow for very minute increments of adjustment of the vertical position of the head assembly 64 so as to achieve precise positioning of the head assembly 64 relative to the magnetic tape 58.

While the invention has been particularly shown and described with reference to a preferred embodiment thereof, it will be understood by those skilled in the art that various changes in form and details may be made therein without departing from the spirit and scope of the invention.

What is claimed is:

1. A transport for an elongated web member comprising the combination of:
   an elongated web member;
   a transducer disposed adjacent the elongated web member;
   a pair of capstans of like diameter disposed on opposite sides of the transducer and each contacting the elongated web member;
   a pair of rotatable shafts, each mounting a different one of the pair of capstans;
   a first generally circular member coupled to one of the pair of shafts and having a given diameter;
   a second generally circular member coupled to the other one of the pair of shafts and having a diameter larger than the given diameter of the first generally circular member;
   an elongated driving member engaging the first and second generally circular members so as to rotatably drive the first and second generally circular members in response to movement thereof;
   means for moving the elongated driving member to rotatably drive the first and the second generally circular members, the larger diameter of the second generally circular member relative to the given diameter of the first generally circular member attempting to cause the one of the pair of shafts and the capstan mounted thereon to rotate faster than the other one of the pair of shafts and the capstan mounted thereon in response to movement of the elongated driving member;
   the first generally circular member being coupled to the one of the pair of rotatable shafts by first means for coupling the first generally circular member to the one of the pair of rotatable shafts when the first generally circular member is rotated in a first direction relative to the one of the pair of rotatable shafts, the first means for coupling being operative to uncouple the first generally circular member from the one of the pair of rotatable shafts when the first generally circular member is rotated in a direction opposite the first direction relative to the one of the pair of rotatable shafts;
   the second generally circular member being coupled to the other one of the pair of rotatable shafts by second means for coupling the second generally circular member to the other one of the pair of rotatable shafts when the second generally circular member is rotated in a second direction relative to the shaft, the second direction being opposite the first direction, the second means for coupling being operative to uncouple the second generally circular member from the other one of the pair of rotatable shafts when the second generally circular member is rotated in a direction opposite the second direction relative to the other one of the pair of rotatable shafts;
   a third generally circular member having a diameter larger than the given diameter of the first generally circular member;
   a fourth generally circular member having the given diameter;
   third means for coupling the third generally circular member to the one of the pair of shafts when the third generally circular member is rotated in the first direction relative to the one of the pair of shafts, the third means for coupling being operative to uncouple the third generally circular member from the one of the pair of shafts when the third generally circular member is rotated in a direction opposite the first direction relative to the one of the pair of rotatable shafts;

fourth means for coupling the fourth generally circular member to the other one of the pair of shafts when the fourth generally circular member is rotated in the second direction relative to the other one of the pair of shafts, the fourth means for coupling being operative to uncouple the fourth generally circular member from the other one of the pair of shafts when the fourth generally circular member is rotated in a direction opposite the second direction relative to the other one of the pair of rotatable shafts;

a second driving member engaging the third and fourth generally circular members so as to rotatably drive the third and the fourth generally circular members in response to movement thereof; and means for moving the second elongated driving member to rotatably drive the third and the fourth generally circular members, the larger diameter of the third generally circular member relative to the given diameter of the fourth generally circular member attempting to cause the other one of the pair of shafts and the capstan mounted thereon to rotate faster than the one of the pair of shafts and the capstan mounted thereon in response to movement of the second elongated driving member in a particular direction.

2. The invention set forth in claim 1, wherein each of the pair of shafts is rotatable about an axis of rotation thereof and further including means associated with each of the pair of rotatable shafts for allowing movement of the axis of rotation of the shaft, whereby the capstan mounted on the shaft can remain engaged with a varying pack of the elongated web member on an adjacent reel.

3. The invention set forth in claim 1, further including a pair of reels, an elongated web member wound around each of the pair of reels and extending between the pair of reels and adjacent the transducer, means for maintaining a first one of the pair of capstans in contact with the portion of the elongated web member wound around a first one of the pair of reels and means for maintaining a second one of the pair of capstans in contact with the portion of the elongated web member wound around a second one of the pair of reels.

4. A transport for an elongated web member comprising the combination of:

an elongated web member;

first and second rotatably mounted reels having the elongated web member wound thereon and extended therebetween;

first and second rotatable capstans mounted adjacent the first and second reels respectively;

means for normally urging the first and second capstans toward the first and second reels respectively;

means for rotatably driving the first and second capstans in a first direction or in an opposite second direction, the means for rotatably driving including means for driving the second capstan at a greater speed than the first capstan when the first and second capstans are being driven in the first direction and including a first elongated drive member, first and second drive elements of different size engaging spaced-apart portions of the first elongated drive member and first and second unidirectional clutch elements respectively coupled between the first and second drive elements of different size and the first and second rotatable capstans, and means for driving the first capstan at a greater speed than the second capstan when the first and second capstans are being driven in the opposite second direction and including a second elongated drive member, third and fourth drive elements of different size engaging spaced-apart portions of the second elongated drive member and third and fourth unidirectional clutch elements respectively coupled between the third and fourth drive elements of different size and the first and second rotatable capstans; and means for converting a difference in the speeds of the first and second capstans into tension in an elongated web member wound on and extended between the first and second reels.

5. A magnetic tape transport comprising the combination of:

a magnetic head assembly disposed in a tape path;

first and second capstans disposed in the tape path on opposite sides of the head assembly;

first and second rotatable shafts mounting the first and second capstans respectively;

first and second pulleys coupled to the first and second rotatable shafts respectively, the second pulley having a larger diameter than the first pulley, the first pulley engaging the first rotatable shaft when it rotates in a first direction relative to the first rotatable shaft, the second pulley engaging the second rotatable shaft when it rotates in a second direction relative to the second rotatable shaft, the second direction being opposite the first direction;

a first endless belt engaging the first and second pulleys;

third and fourth pulleys coupled to the first and second rotatable shafts respectively, the third pulley having a larger diameter than the fourth pulley, the third pulley engaging the first rotatable shaft when it rotates in the first direction relative to the first rotatable shaft, the fourth pulley engaging the second rotatable shaft when it rotates in the second direction relative to the second rotatable shaft;

a second endless belt engaging the third and fourth pulleys; and means for driving the first and second belts.

6. The invention set forth in claim 5, further comprising first, second, third and fourth unidirectional clutches respectively mounting the first, second, third and fourth pulleys on the first and second shafts, the first and third clutches engaging to couple the first and third pulleys to the first shaft when the first and third pulleys are rotated in a first direction relative to the first shaft and the second and fourth clutches engaging to couple the second and fourth pulleys to the second shaft when the second and fourth pulleys are rotated in a second direction opposite the first direction relative to the second shaft.

7. The invention set forth in claim 6, wherein the means for driving the first and second belts includes a motor having a shaft and fifth and sixth pulleys mounted on the shaft, the fifth and sixth pulleys being engaged by the first and second belts respectively.

8. The invention set forth in claim 7, further including an idler shaft, seventh and eighth pulleys mounted on the shaft and engaged by the first and second belts respectively and means for resiliently urging the idler shaft in a direction to maintain the first and second belts in a taut condition.

9. The invention set forth in claim 5, further including a base member mounting the head assembly thereon and having first and second slots therein in which the first and second shafts are respectively disposed, a first elongated bracket having a first end thereof pivotally mounted on the base member along a pivot axis and pivotally mounting the first shaft at an opposite second end thereof and a second elongated bracket having a first end thereof pivotally mounted on the base member along the pivot axis and pivotally mounting the second shaft at an opposite second end thereof.

10. The invention set forth in claim 9, further comprising a common bracket mounting shaft coupled to the base member and extending along the pivot axis, and wherein the first ends of the first and second elongated brackets comprise pluralities of interleaved finger portions receiving the common bracket mounting shaft.

11. The invention set forth in claim 9, further comprising an elongated limit member mounted on the first elongated bracket and being operative to engage the second elongated bracket when the second elongated bracket reaches a predetermined rotational position relative to the first elongated bracket to prevent further rotational movement of the second elongated bracket relative to the first elongated bracket.

12. The invention set forth in claim 5, further including a first tape reel disposed adjacent the first capstan and a second tape reel disposed adjacent the second capstan.

* * * * *